(12) United States Patent
Garrett et al.

(10) Patent No.: US 10,277,533 B2
(45) Date of Patent: Apr. 30, 2019

(54) CUT-THROUGH BRIDGE ERROR ISOLATION

(71) Applicant: International Business Machines Corporation, Armonk, NY (US)

(72) Inventors: Tynan J. Garrett, Poughkeepsie, NY (US); Jeffrey C. Hanscom, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 15/355,442

(22) Filed: Nov. 18, 2016

(65) Prior Publication Data

US 2018/0145872 A1 May 24, 2018

(51) Int. Cl.
*H04L 12/24* (2006.01)
*H04L 12/947* (2013.01)
*H04L 29/06* (2006.01)
*G06F 11/07* (2006.01)

(52) U.S. Cl.
CPC ........ *H04L 49/251* (2013.01); *G06F 11/0796* (2013.01); *H04L 69/22* (2013.01)

(58) Field of Classification Search
CPC .... H04L 41/0677; H04L 49/251; H04L 69/22
See application file for complete search history.

(56) References Cited

U.S. PATENT DOCUMENTS

| 7,634,713 | B1 | 12/2009 | Ngo | |
|---|---|---|---|---|
| 9,104,564 | B2 | 8/2015 | Gilda et al. | |
| 2001/0041496 | A1* | 11/2001 | Smirnov | A63H 3/28 |
| 2003/0136882 | A1* | 7/2003 | Heywood | B61L 3/00 |
| 2006/0155938 | A1* | 7/2006 | Cummings | G11C 7/1048 711/149 |
| 2013/0173696 | A1* | 7/2013 | Lee | 709/203 |
| 2015/0139649 | A1* | 5/2015 | Kikuchi | H04J 14/06 |
| 2016/0226797 | A1* | 8/2016 | Aravinthan | H04L 49/3027 |

\* cited by examiner

*Primary Examiner* — Ronald B Abelson
(74) *Attorney, Agent, or Firm* — Cantor Colburn LLP; Steven Chiu

(57) ABSTRACT

A system includes a cut-through bridge including a plurality of stages within a controller for communication packet transmission to transfer data and one or more control signals successively between the stages. The system also includes a control signal interceptor within the controller operable to intercept control signals between a first stage and a second stage of the cut-through bridge. The control signal interceptor is further operable to generate a forced valid control signal for each of the control signals regardless of an error condition of the control signals. The control signal interceptor outputs the forced valid control signal for each of the control signals to the second stage of the cut-through bridge. The forced valid control signal for each of the control signals is propagated through one or more successive stages of the cut-through bridge to an end stage to prevent an invalid state at the end stage.

16 Claims, 7 Drawing Sheets

CUT-THROUGH BRIDGE ERROR ISOLATION

BACKGROUND

Aspects are related generally to computer-based communication systems, and more specifically to cut-through bridge error isolation in a computer system.

Many types of communication protocols have been defined in the art. One such example, peripheral component interconnect express (PCIe), is a component level interconnect standard that defines a bi-directional communication protocol for transactions between input/output (I/O) adapters and host systems. PCIe communications are encapsulated in packets according to the PCIe standard for transmission on a PCIe bus. Packets originating at I/O adapters and ending at host systems are referred to as upbound packets. Packets originating at host systems and terminating at I/O adapters are referred to as downbound packets. PCIe transactions include a request packet and, if required, a completion packet (also referred to herein as a "response packet") in the opposite direction. The PCIe topology is based on point-to-point unidirectional links that are paired (e.g., one upbound link, one downbound link) to form the PCIe bus.

Prior to transmission of PCIe packets and/or other packetized communication formats within and/or between computer systems, an internal bus protocol may be used within a controller including a cut-through bridge design, where a single packet can be stretched across multiple stages of processing. In some instances, control signal violations at an upstream interface can cause downstream logic to go into an invalid state. Examples include receiving too few data beats, an end assertion missing, and the like. While error checking may be performed at each stage of a cut-through bridge, this results in complex logic and duplicate error checks. Thus, there is a need to provide efficient error isolation for cut-through bridges in a computer system.

SUMMARY

According to one embodiment, a system includes a cut-through bridge including a plurality of stages within a controller for communication packet transmission to transfer data and one or more control signals successively between the stages. The system also includes a control signal interceptor within the controller. The control signal interceptor is operable to intercept the one or more control signals between a first stage and a second stage of the cut-through bridge. The control signal interceptor is further operable to generate a forced valid control signal for each of the one or more control signals regardless of an error condition of the one or more control signals. The control signal interceptor outputs the forced valid control signal for each of the one or more control signals to the second stage of the cut-through bridge. The forced valid control signal for each of the one or more control signals is propagated through one or more successive stages of the cut-through bridge to an end stage to prevent an invalid state at the end stage.

According to an embodiment, a method includes intercepting, by a control signal interceptor of a controller, one or more control signals between a first stage and a second stage of a cut-through bridge of the controller comprising a plurality of stages for communication packet transmission. A forced valid control signal for each of the one or more control signals is generated regardless of an error condition of the one or more control signals. The forced valid control signal for each of the one or more control signals is output to the second stage of the cut-through bridge. The forced valid control signal for each of the one or more control signals is propagated through one or more successive stages of the cut-through bridge to an end stage to prevent an invalid state at the end stage.

According to an embodiment, a computer program product includes a computer readable storage medium having program instructions embodied therewith. The program instructions are executable by a processing circuit of a controller to cause the processing circuit to intercept one or more control signals between a first stage and a second stage of a cut-through bridge comprising a plurality of stages for communication packet transmission and generate a forced valid control signal for each of the one or more control signals regardless of an error condition of the one or more control signals. The program instructions further cause the processing circuit to output the forced valid control signal for each of the one or more control signals to the second stage of the cut-through bridge and propagate the forced valid control signal for each of the one or more control signals through one or more successive stages of the cut-through bridge to an end stage to prevent an invalid state at the end stage.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments provide error isolation in cut-through bridge designs by intercepting control signals and generating valid control signal assertion downstream of an error until reaching the end of a logic chain. When a packet is pushed across an interface including a cut-through bridge with multiple stages, data and control signals propagate across the stages to an end stage for buffering prior to transmission on a communication interface. Rather than providing redundant error checks for each stage of the cut-through bridge, embodiments intercept one or more control signals after successfully passing a first stage of the cut-through bridge and force assertion of valid control signals regardless of a subsequent error condition in the control signals associated with a multi-cycle data packet. Assertion of the control signals to downstream logic continues, and interface controls are ignored until reaching the point where the packet end is expected. In some embodiments, error checking results can be forwarded with data to downstream logic or reported elsewhere. The forced assertion of control signals to a valid state can reduce the risk of errors escalating and impacting additional devices and/or reaching a hung state due to an overflow/underflow condition.

Figure 1:
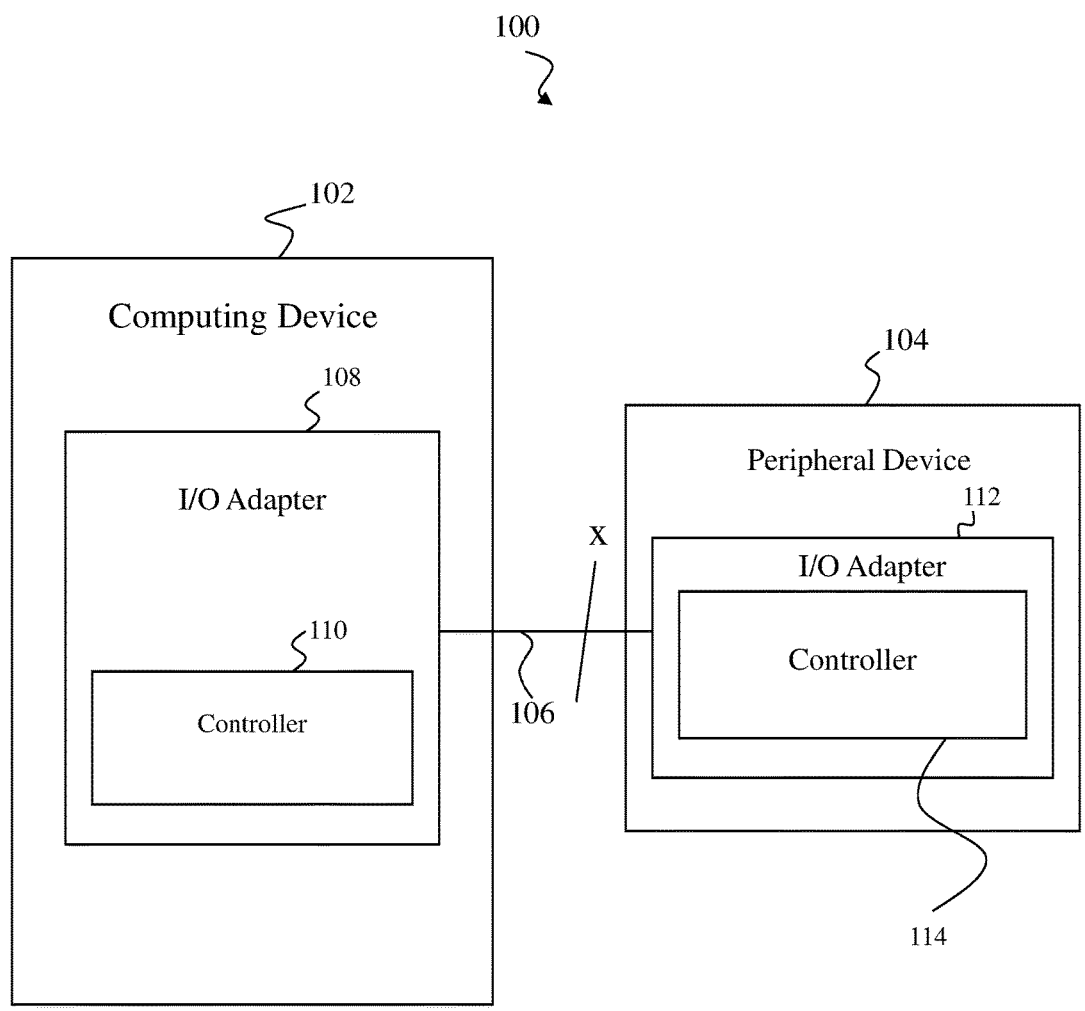
FIG. 1 illustrates a system in accordance with an embodiment.

FIG. 1 illustrates a system 100 on which embodiments may operate. The system 100 includes a computing device 102 and a peripheral device 104. The computing device 102 may be any type of computing device, such as, for example, a personal computer or a server. The computing device 102 performs operations and generates commands and data for transmission to the peripheral device 104. The computing device 102 may be referred to herein as a "root" or a "root complex". The peripheral device 104 may be any type of device capable of receiving commands and data from the computing device 102. For example, the peripheral device 104 may be a monitor, printer, memory unit, or the like.

The computing device 102 and the peripheral device 104 are coupled to one another by a communications link 106. In one embodiment, the communications link 106 may be a PCI Express link. As discussed, a PCI Express link (or bus) is built around pairs of serial (1-bit), unidirectional point-to-point connections also known as "lanes". The number of lanes can be variable and is indicated by the "x" related to the communications link 106. In alternate embodiments, one or more other known packet-based communication protocols can be used in the system 100.

In more detail, the computing device 102 may include an input/output (I/O) adapter 108 that allows for the physical connection to the communications link 106. The I/O adapter 108 may be operatively connected to a controller 110. In general, the controller 110 serves to control the operation of the I/O adapter 108. The controller 110 can be integrally formed or separate from the I/O adapter 108. In more detail, the controller 110 controls the creation, transmission, and reception of data packets transferred between the computing device 102 and the peripheral device 104 over the communications link 106. The controller 110 may also handle the creation and transmission of flow control credits and transaction layer packets, among other things. In embodiments, the I/O adapter 108 can be a PCIe adapter. The controller 110 may include one or more processing circuits that can be configured to execute processes as further described herein based on program instructions that establish configuration, layout, timing, and/or other functional characteristics of the controller 110 as parallel and/or sequential operations.

The peripheral device 104 may also include an I/O adapter 112 and a controller 114. The I/O adapter 112 may be operatively connected to the controller 114 of the peripheral device 104. In general, the controller 114 serves to control the operation of the I/O adapter 112. The controller 114 can be integrally formed or separate from the I/O adapter 112. In more detail, the controller 114 controls the creation, transmission, and reception of data packets transferred between the peripheral device 104 and the computing device 102 over the communications link 106. The controller 114 may also handle the creation and transmission of flow control credits and transaction layer packets, among other things. In embodiments, the I/O adapter 112 can be a PCIe adapter. The controller 114 may include one or more processing circuits that can be configured to execute processes as further described herein based on program instructions that establish configuration, layout, timing, and/or other functional characteristics of the controller 114 as parallel and/or sequential operations.

Figure 2:
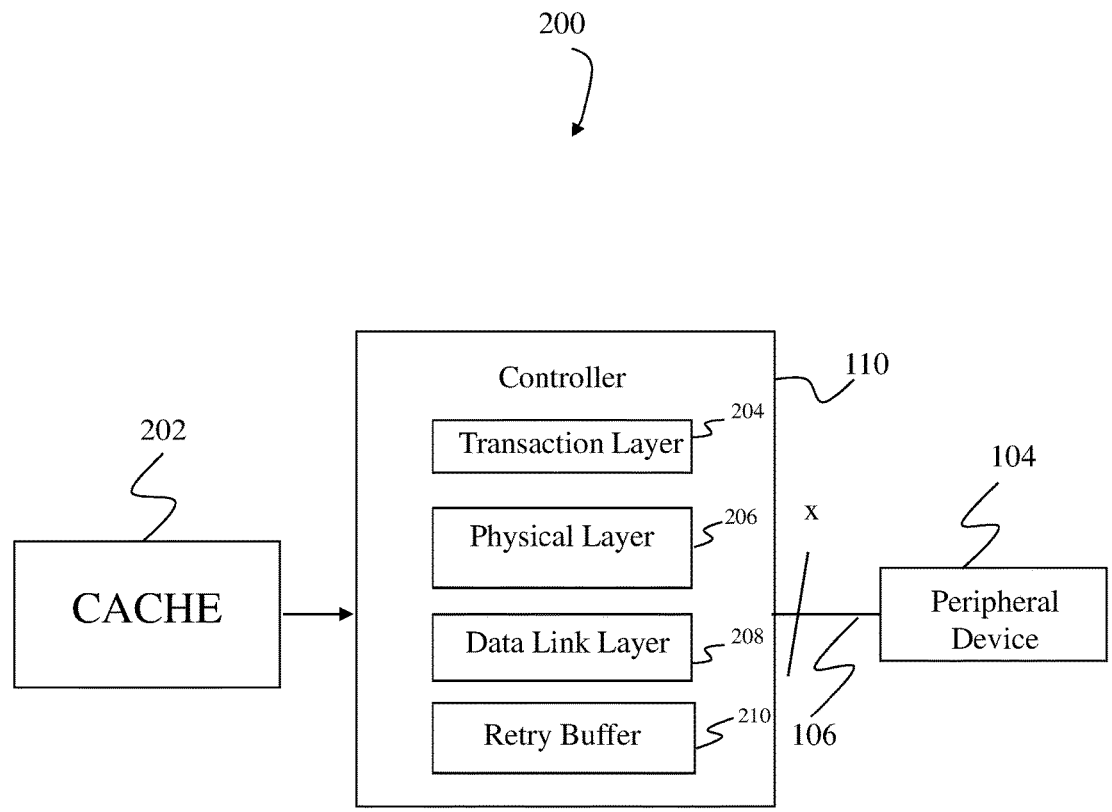
FIG. 2 illustrates a more detailed depiction of a portion of the system shown in FIG. 1 in accordance with an embodiment.

FIG. 2 depicts a block diagram of a portion of the system 100 shown in FIG. 1 in more detail as system 200. In particular, the system 200 includes a cache 202 coupled to controller 110. Information and commands to be transferred from the computing device 102 (FIG. 1) can be stored in the cache 202. The controller 110 handles the transmission of information to the peripheral device 104 via the communications link 106.

The controller 110 can implement, among other things, the PCI Express protocol and/or other protocols. In addition, the controller 110 is configured to implement some or all of the aspects of embodiments.

The PCI Express protocol defines a transaction layer 204, a data link layer 208, and a physical layer 206. These layers 204-208 may also be present in the peripheral device 104. As shown, the controller 110 also includes a retry buffer 210. In general, the retry buffer 210 stores packets that have been sent by the controller 110 to the peripheral device 104 until the peripheral device 104 acknowledges receipt of the packets with a defined "ACK" indicator. In the event that a receipt is not acknowledged, one or more packets can be resent from the retry buffer 210.

The transaction layer 204 assembles packets of transaction requests, such as reads and writes, from the computing device 102 (FIG. 1). In common usage, these requests may be said to be received from the "core". Header information is added to the transaction requests, to produce transaction layer packets (TLPs). The data link layer 208 applies a data protection code, such as a cyclic redundancy check (CRC), and assigns a sequence number to each TLP. At the physical layer 206, the TLP is framed and converted to a serialized format, then is transmitted across the communications link 106 at a frequency and width compatible with the peripheral device 104.

At the peripheral device 104, the process is reversed. The physical layer converts the serialized data back into packet form, and stores the extracted TLP in memory at the data link layer. The data link layer verifies the integrity of the received TLP, such as by performing a CRC check of the packet, and also confirms the sequence number of the packet. After both checks are performed, the TLP, excluding the sequence number and the data link layer CRC, is forwarded to the transaction layer. The transaction layer disassembles the packet into information (e.g., read or write requests) that is deliverable to the device core. The transaction layer also detects unsupported TLPs and may perform its own data integrity check. If the packet transmission fails, the data link layer requests retransmission of the TLP from the retry buffer 210, known as a link layer retry (LLR).

Figure 3:
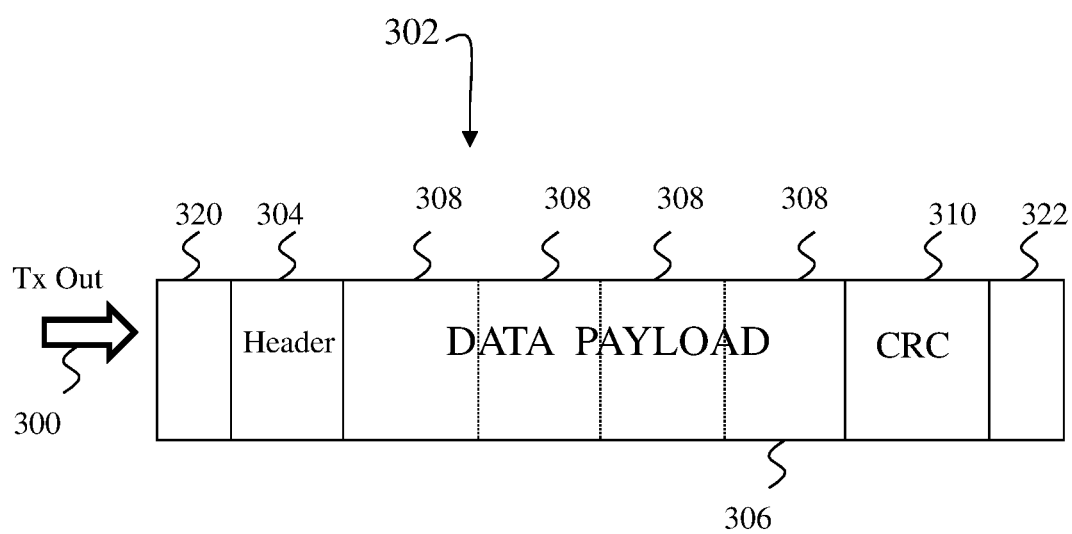
FIG. 3 illustrates an example of a packet for transmission in accordance with an embodiment.

FIG. 3 illustrates a packet 302 for transmission in accordance with an embodiment. The packet 302 can be sent from a transmission output 300 in a single clock cycle or spread across multiple clock cycles. The packet 302 can include a header portion 304, a payload portion 306, and cyclical redundancy check (CRC) portion 310 used for error detection and correction. The packet 302 may also include framing symbols marking the beginning 320 and the end 322 of the packet 302. The payload portion 306 can be divided by multiple boundaries 308. Each boundary 308 can be a fixed distance from its nearest neighbor. In one embodiment, the distance between each boundary 308 is the width of the interface supplying the data. The controller 110, 114 may format the packet 302 for transmission on communications link 106 of FIG. 1.

Figure 4:
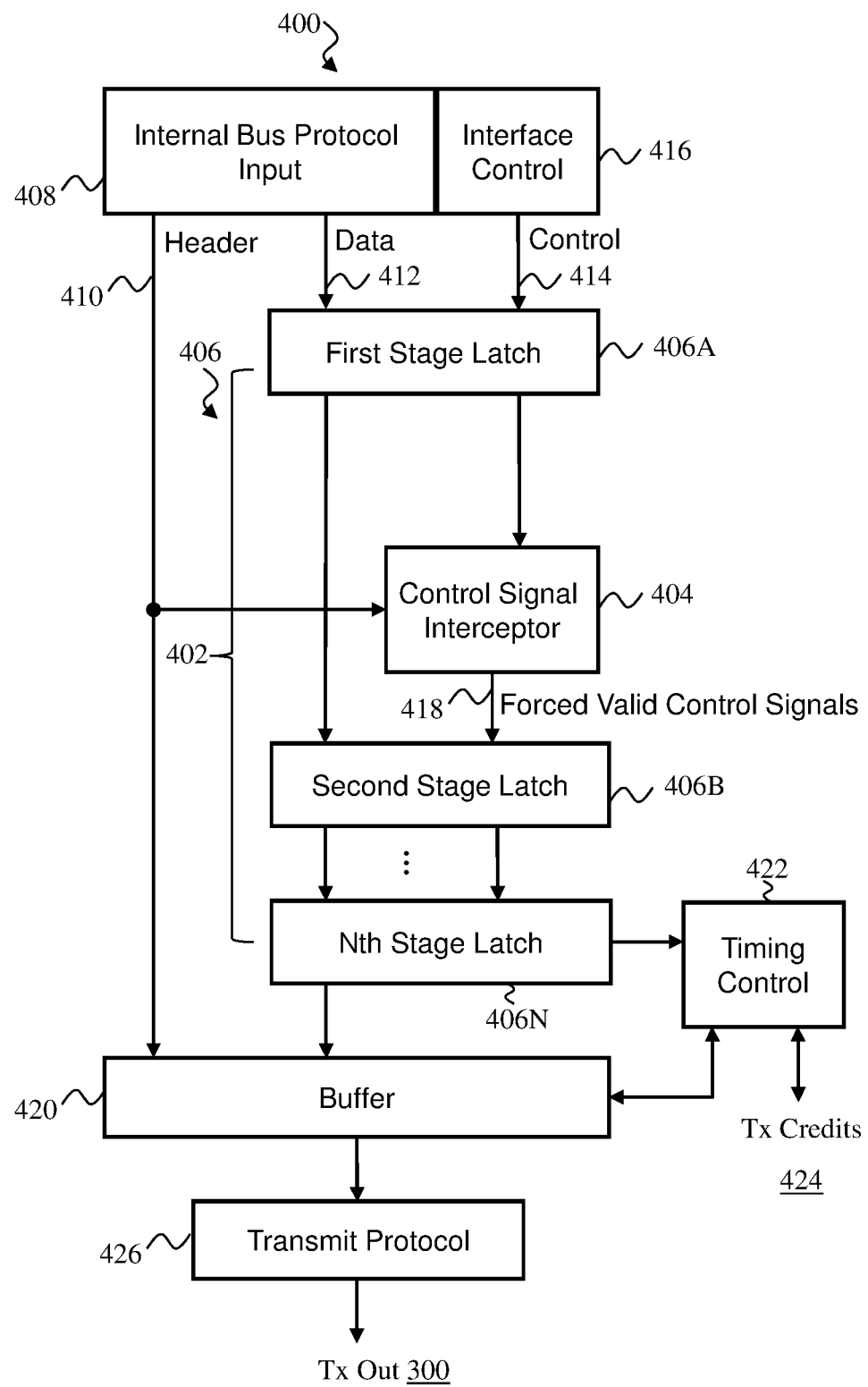
FIG. 4 illustrates a system including a cut-through bridge with a control signal interceptor in accordance with an embodiment.

FIG. 4 illustrates a system 400 that includes a cut-through bridge 402 and a control signal interceptor 404 that may be part of the controller 110, 114 of FIG. 1. The cut-through bridge 402 can include multiple stages 406A-406N (also referred to as stage latches 406A-406N) depicted as a first stage latch 406A, a second stage latch 406B, and an Nth stage latch 406N as the end stage 406N. There may be zero or more intermediate stages between the first stage latch 406A and the Nth stage latch 406N. An internal bus protocol input 408 can provide a header 410 and data 412 to the cut-through bridge 402 for communication packet transmission to transfer the data 412 and one or more control signals 414 (from interface control 416) successively between the stages 406A-406N in a multi-cycle packet transmission.

The control signal interceptor 404 is operable to intercept the one or more control signals 414 between the first stage 406A and the second stage 406B of the cut-through bridge 402. The control signal interceptor 404 generates a forced valid control signal 418 for each of the one or more control signals 414 regardless of an error condition of the one or more control signals 414. The control signal interceptor 404 outputs the forced valid control signal 418 for each of the one or more control signals 414 to the second stage 406B of the cut-through bridge 402. The forced valid control signal 418 for each of the one or more control signals 414 propagates through one or more successive stages 406 of the cut-through bridge 402 to an end stage 406N to prevent an invalid state at the end stage 406N. An example sequence of the forced valid control signals 418 is depicted in table 1, where it is expected that a start signal and data valid signal will initially be asserted, the data valid signal will remain asserted, and the end signal will be asserted at an expected cycle based on the expected number of cycles determined from one or more values of the header 410.

TABLE 1

Example forced valid control signal sequence

| Start Signal | Data Valid Signal | End Signal |
|---|---|---|
| 1 | 1 | 0 |
| 0 | 1 | 0 |
| . . . | . . . | . . . |
| 0 | 1 | 1 |

In embodiments, the control signals 414 identified as invalid prior to reaching the first stage latch 406A may result in aborting the transmission of a packet through the cut-through bridge 402 before transmission begins. Once at least one valid cycle of control signals 414 passes from the first stage latch 406A to the control signal interceptor 404 (e.g., start signal with data valid), the forced valid control signals 418 output by the control signal interceptor 404 ensure that an expected number of cycles elapses to maintain system timing expectations. The header 410 can be examined by the control signal interceptor 404 to determine a number of expected cycles before the data 412 and control signals 414 for a packet reach the control signal interceptor 404. The header 410 can include one or more values, such as a message length, that may be defined as a number of bytes. The control signal interceptor 404 can convert the message length from bytes to cycles based on bus width, address alignment offsets, and/or other known timing constraints such that the force valid control signals 418 match size/timing definitions in the header 410. The cut-through bridge 402 can output the data 412 from the end stage 406N to a buffer 420. The buffer 420 may also receive the header 410 directly or after passing through another structure, such as the cut-through bridge 402. The forced valid control signal 418 for each of the one or more control signals 414 output from the end stage 406N can be provided to a timing control 422 that manages transmission timing from the buffer 420.

In some embodiments, status of the buffer 420, such as buffer full/buffer overflow/buffer underflow, can be used to control the flow of transmission credits 424, for instance, by the timing control 422. The transmission credits 424 may be used to signal internal actions within the controller 110 of FIGS. 1 and 2, such as passing values to a transmit protocol 426 (e.g., layers 204-208 of FIG. 2) for transmission output 300 and/or sending one or more additional packets on internal bus protocol input 408. Rather than reaching a hung state, the forced valid control signals 418 can be used to trigger a truncation of the data 412 at the buffer 420 to prevent an overflow or insert 'don't care' values for the data 412 at the buffer 420 to prevent an underflow.

Figure 5:
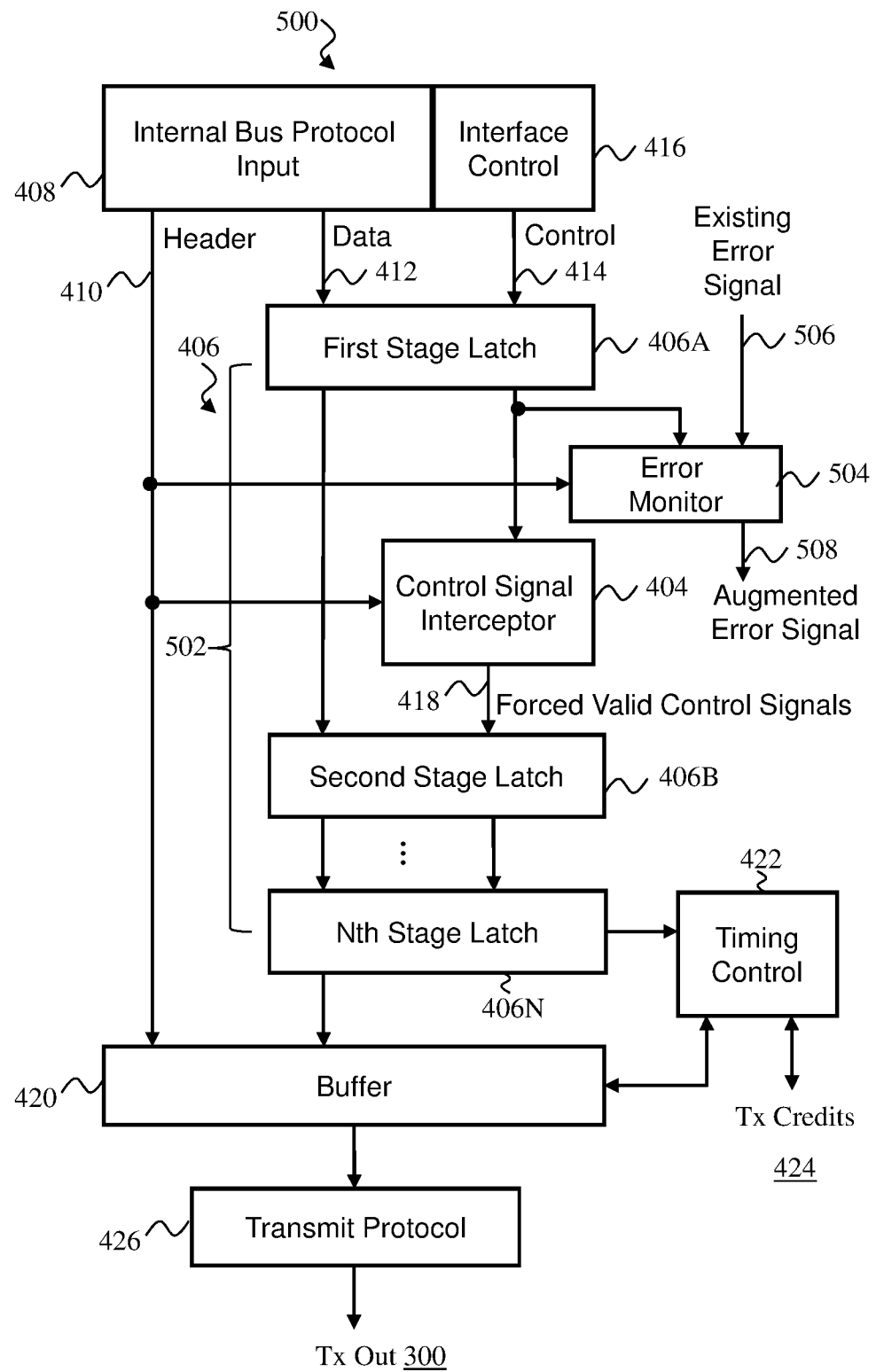
FIG. 5 illustrates a system including a cut-through bridge with a control signal interceptor and an error monitor in accordance with an embodiment.

FIG. 5 illustrates a system 500 that includes a cut-through bridge 502. Similar to the system 400 of FIG. 4, the system 500 of FIG. 5 includes like numbered elements with similar functionality as previously described with respect to the system 400 of FIG. 4. The cut-through bridge 502 adds an error monitor 504 between the first stage 406A and the second stage 406B of the cut-through bridge 502. The error monitor 504 is operable to detect an error condition of the one or more control signals 414, logically-OR the error condition with an existing error signal 506 as an augmented error signal 508, and output the augmented error signal 508. For example, the error monitor 504 can examine the header 410 to determine an expected number of cycles and detect an error condition if the control signals 414 do not transition on expected cycles. Further, the error monitor 504 can detect whether one of the control signals 414 transitions unexpectedly, such as a data valid signal going invalid after a start signal but before an end signal. Alternate or additional error checks can also be performed by the error monitor 504. The augmented error signal 508 may propagate with the forced valid control signals 418 through the cut-through bridge 502 to an end stage 406N or be passed to other error handling/reporting logic (not depicted).

Figure 6:
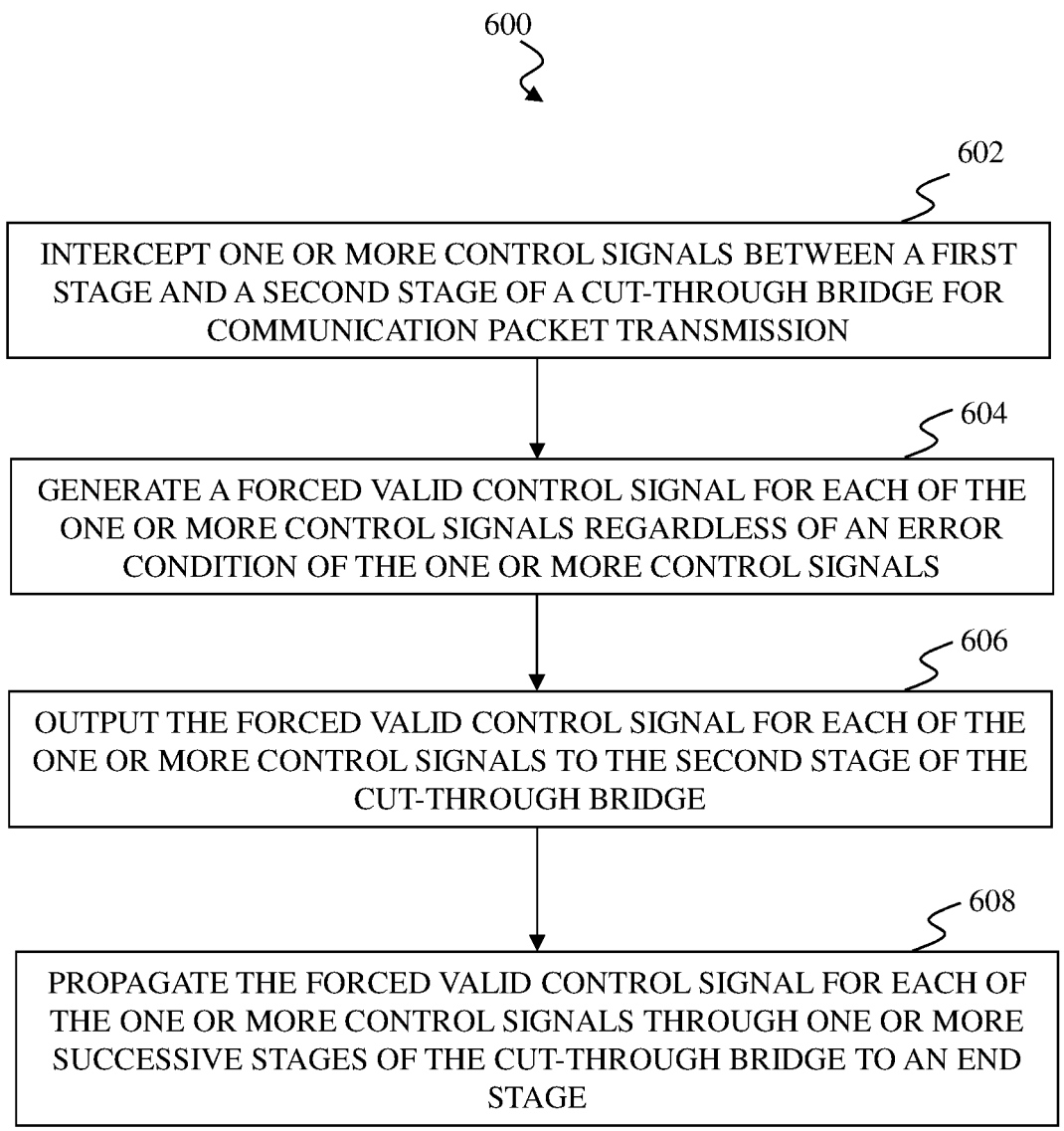
FIG. 6 illustrates a process flow in accordance with an embodiment.

Turning now to FIG. 6, a flow diagram of a process 600 is generally shown in accordance with an embodiment. The process 600 is described with reference to FIGS. 1-6 and may include additional steps beyond those depicted in FIG. 6. Although described in reference to controller 110, it will be understood that the process 600 can be performed by other controllers, such as controller 114. The controller 110 can implement the process 600 using a combination of the logic of FIGS. 4 and/or 5. A general example is described with respect to FIG. 6. The process 600 can be incorporated in the I/O adapters 108 and/or 112 of FIG. 1 or in other system elements.

At block 602, a control signal interceptor 404 of the controller 110 intercepts one or more control signals 414 between a first stage 406A and a second stage 406B of a cut-through bridge 402, 502 of the controller 110 that includes a plurality of stages 406 for communication packet transmission. The one or more control signals 414 can include, for example, a start signal, a data valid signal, and an end signal in parallel. In some embodiments, an error signal is included with the one or more control signals 414. For example, an error module 504 between the first stage 406A and the second stage 406B of the cut-through bridge 502 can detect an error condition of the one or more control signals 414. A logical-OR of the error condition can be applied with an existing error signal 506 as an augmented error signal 508 to be output for separate error reporting directly or passed through the stages 406 of the cut-through bridge 502.

At block 604, a forced valid control signal 418 is generated for each of the one or more control signals 414 regardless of an error condition of the one or more control signals 414. A header 410 associated with a data packet (e.g., one or more cycles of data 412) passed through the stages 406 of the cut-through bridge 402, 502 can be examined and signal transition timing of the forced valid control signal 418 for each of the one or more control signals 414 established based on one or more values of the header 410. One or more values of the header 410 can be a message length that is converted to an expected number of cycles (e.g., using a bus width, byte length, and address alignment based on the header 410).

At block 606, the forced valid control signal 418 is output for each of the one or more control signals 414 to the second stage 406B of the cut-through bridge 402, 502. At block 608, the forced valid control signal 418 for each of the one or more control signals 414 is propagated through one or more successive stages 406 of the cut-through bridge 402, 502 to an end stage 406N to prevent an invalid state at the end stage 406N. The data 412 from the end stage 406N can be output to a buffer 420. The forced valid control signal 418 for each of the one or more control signals 414 output from the end stage 406N can be provided to a timing control 422 that manages transmission timing from the buffer 420.

Figure 7:
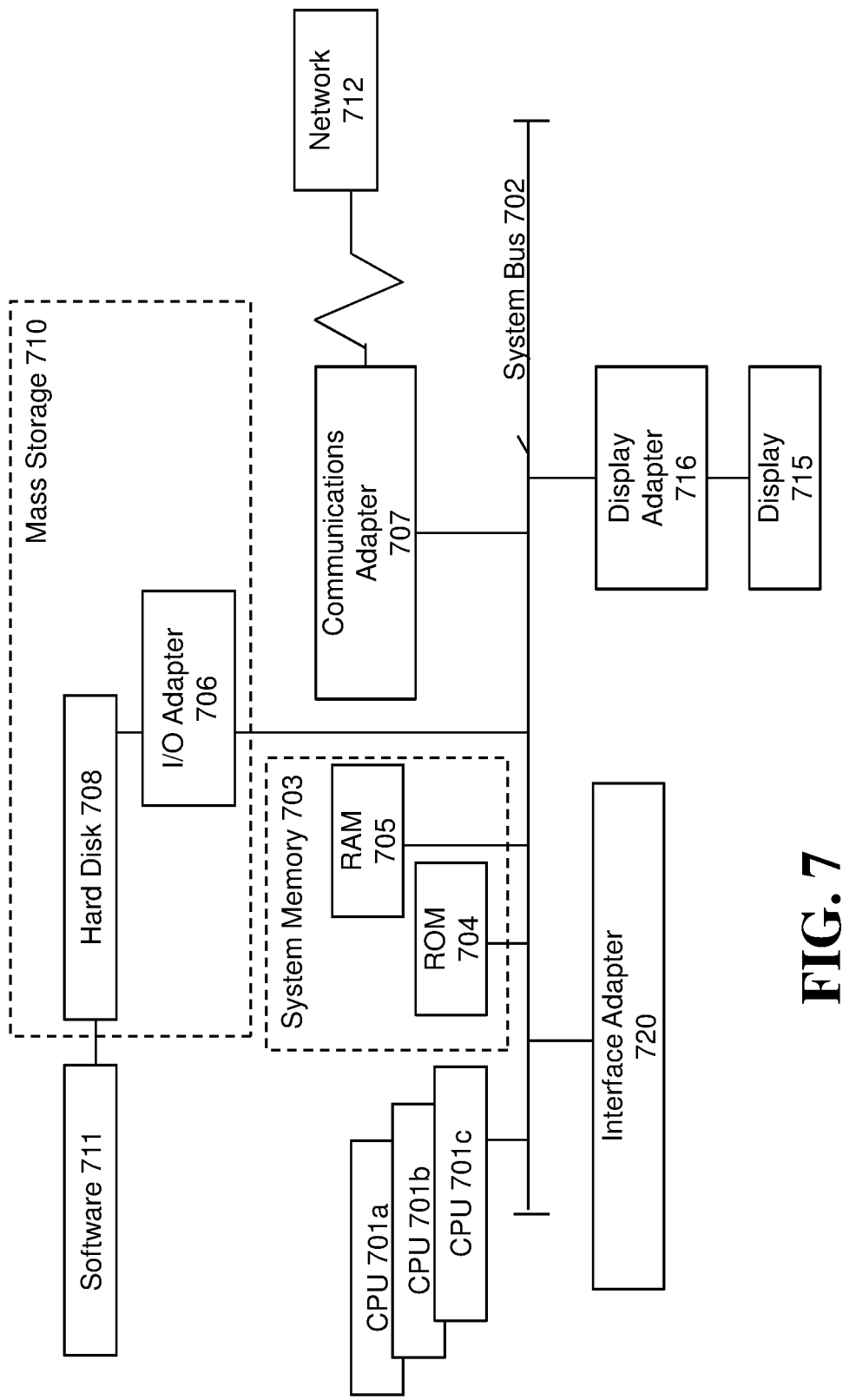
FIG. 7 illustrates a processing system in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701 can be an embodiment of the computing device 102 of FIG. 1. The processors 701, also referred to as processing circuits, are coupled via a system bus 702 to a system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 7 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Alternatively, the I/O adapter 706 and/or the communications adapter 707 can be embodiments of the I/O adapter 108 or I/O adapter 112. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the process flow 600 of FIG. 6. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include protocols, such as PCIe. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 7, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

Technical effects and benefits include reduced latency with simplified error condition processing and reduced risk of reaching a hung state due to an error condition, thus improving computer system performance and efficiency.

Embodiments may include a system and/or a method at any possible technical detail level of integration. The system may include a computer readable storage medium (or media) having computer readable program instructions thereon for causing a processor to carry out aspects of the embodiments herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a cut-through bridge comprising a plurality of stages within a controller for communication packet transmission to transfer data and one or more control signals successively between the stages; and
    a control signal interceptor within the controller, the control signal interceptor operable to:
        intercept the one or more control signals between a first stage and a second stage of the cut-through bridge;
        generate a forced valid control signal for each of the one or more control signals regardless of an error condition of the one or more control signals;
        examine a header associated with a data packet passed through the stages of the cut-through bridge;
        establish signal transition timing of the forced valid control signal for each of the one or more control signals based on one or more values of the header;
        output the forced valid control signal for each of the one or more control signals to the second stage of the cut-through bridge; and
        propagate the forced valid control signal for each of the one or more control signals through one or more successive stages of the cut-through bridge to an end stage to prevent an invalid state at the end stage, wherein the forced valid control signal for each of the one or more control signals output from the end stage is provided to a timing control that manages transmission timing from a buffer, and the cut-through bridge outputs the data from the end stage to the buffer.

2. The system of claim 1, wherein the system is part of a peripheral component interconnect express (PCIe) adapter.

3. The system of claim 1, wherein the one or more values of the header comprise a message length.

4. The system of claim 3, wherein the control signal interceptor is operable to convert the message length to an expected number of cycles.

5. The system of claim 1, wherein the one or more control signals comprise a start signal, a data valid signal, and an end signal in parallel.

6. The system of claim 1, further comprising an error monitor between the first stage and the second stage of the cut-through bridge, the error monitor operable to detect the error condition of the one or more control signals, logically-OR the error condition with an existing error signal as an augmented error signal, and output the augmented error signal.

7. A method comprising:
intercepting, by a control signal interceptor of a controller, one or more control signals between a first stage and a second stage of a cut-through bridge of the controller comprising a plurality of stages for communication packet transmission;
generating a forced valid control signal for each of the one or more control signals regardless of an error condition of the one or more control signals;
examining a header associated with a data packet passed through the stages of the cut-through bridge;
establishing signal transition timing of the forced valid control signal for each of the one or more control signals based on one or more values of the header;
outputting the forced valid control signal for each of the one or more control signals to the second stage of the cut-through bridge;
propagating the forced valid control signal for each of the one or more control signals through one or more successive stages of the cut-through bridge to an end stage to prevent an invalid state at the end stage;
outputting the data from the end stage to a buffer; and
providing the forced valid control signal for each of the one or more control signals output from the end stage to a timing control that manages transmission timing from the buffer.

8. The method of claim 7, wherein the controller is a component of a peripheral component interconnect express (PCIe) adapter.

9. The method of claim 7, wherein the one or more values of the header comprise a message length.

10. The method of claim 9, further comprising:
converting the message length to an expected number of cycles.

11. The method of claim 7, wherein the one or more control signals comprise a start signal, a data valid signal, and an end signal in parallel.

12. The method of claim 7, further comprising:
detecting the error condition of the one or more control signals by an error monitor between the first stage and the second stage of the cut-through bridge;
applying a logical-OR of the error condition with an existing error signal as an augmented error signal; and
outputting the augmented error signal.

13. A computer program product comprising a computer readable storage medium having program instructions embodied therewith, the program instructions executable by a processing circuit of a controller to cause the processing circuit to perform:
intercepting one or more control signals between a first stage and a second stage of a cut-through bridge comprising a plurality of stages for communication packet transmission;
generating a forced valid control signal for each of the one or more control signals regardless of an error condition of the one or more control signals;
examining a header associated with a data packet passed through the stages of the cut-through bridge;
establishing signal transition timing of the forced valid control signal for each of the one or more control signals based on one or more values of the header;
outputting the forced valid control signal for each of the one or more control signals to the second stage of the cut-through bridge;
propagating the forced valid control signal for each of the one or more control signals through one or more successive stages of the cut-through bridge to an end stage to prevent an invalid state at the end stage;
outputting the data from the end stage to a buffer; and
providing the forced valid control signal for each of the one or more control signals output from the end stage to a timing control that manages transmission timing from the buffer.

14. The computer program product of claim 13, wherein the one or more values of the header comprise a message length and the program instructions further cause the processing circuit to convert the message length to an expected number of cycles.

15. The computer program product of claim 13, wherein the one or more control signals comprise a start signal, a data valid signal, and an end signal in parallel.

16. The computer program product of claim 13, wherein the program instructions further cause the processing circuit to perform:
detecting the error condition of the one or more control signals by an error monitor between the first stage and the second stage of the cut-through bridge;
applying a logical-OR of the error condition with an existing error signal as an augmented error signal; and
outputting the augmented error signal.

* * * * *